(12) United States Patent
Rembe et al.

(10) Patent No.: US 8,199,331 B2
(45) Date of Patent: Jun. 12, 2012

(54) VIBROMETER AND METHOD FOR OPTICALLY MEASURING AN OBJECT

(75) Inventors: Christian Rembe, Waldbronn (DE); Georg Siegmund, Karlsbad (DE); Tian-Hua Xu, Karlsbad (DE)

(73) Assignee: Polytec GmbH, Waldbronn (DE)

( * ) Notice: Subject to any disclaimer, the term of this patent is extended or adjusted under 35 U.S.C. 154(b) by 483 days.

(21) Appl. No.: 12/417,107

(22) Filed: Apr. 2, 2009

(65) Prior Publication Data
US 2009/0251706 A1    Oct. 8, 2009

(30) Foreign Application Priority Data
Apr. 2, 2008 (DE) .......................... 10 2008 017 119

(51) Int. Cl.
*G01B 11/02* (2006.01)
(52) U.S. Cl. ........................................ 356/502; 356/484
(58) Field of Classification Search .................. 356/484, 356/502
See application file for complete search history.

(56) References Cited

U.S. PATENT DOCUMENTS

| 4,554,836 | A | * | 11/1985 | Rudd | .............................. 73/657 |
| 5,394,233 | A | * | 2/1995 | Wang | ............................ 356/5.01 |
| 6,271,924 | B1 | | 8/2001 | Ngoi et al. | |

FOREIGN PATENT DOCUMENTS

| DE | 19801959 | 7/1999 |
| DE | 102007003777 | 8/2007 |
| DE | 102006003877 | 10/2007 |
| DE | 102007010387 | 9/2008 |
| DE | 102007010389 | 9/2008 |
| EP | 1148321 | 4/2001 |

OTHER PUBLICATIONS

Rajwa, et al., AOTF-Based System for Image Cytometry, pp. 1-8Proc. SPIE vol. 5694—Spectral Imagining: Instrumentation, Applications, and Analysis III (2005).
Yano, et al., Acoustooptic TeO2 tunable Filter Using Far-Off-Axis Anisotropic Bragg Diffraction, Applied Optics, pp. 2250-2258, vol. 15, No. 9, Sep. 1976.

* cited by examiner

*Primary Examiner* — Tarifur Chowdhury
*Assistant Examiner* — Jonathan Hansen
(74) *Attorney, Agent, or Firm* — Volpe and Koenig, P.C.

(57) ABSTRACT

A vibrometer and a method for optically measuring oscillations at an object, including a radiation source for creating a source beam, a beam splitter to split the source beam into a measuring beam and a reference beam, an optic interference device for interfering the reference beam with a measuring beam, at least partially reflected by the object, and a detector, with the interference device and the detector being embodied cooperating such that a measuring beam, at least partially deflected by the object, and the reference beam interfere on the detector. The vibrometer is embodied as a heterodyne vibrometer, having an optic frequency shift unit, which is arranged in the optical path of the vibrometer, to form a carrier frequency by creating a frequency difference between the measuring beam and the reference beam. The beam splitter and the frequency shift unit are embodied as an acousto-optic modulator in an optic construction element to deflect the source beam, with the acousto-optic modulator being embodied such that the source beam entering the acousto-optic modulator can be split into at least two diffraction beams: a first diffraction beam of diffraction order of 1 and a second diffraction beam of diffraction order of −1, and the acousto-optic modulator is arranged in the optical path of the vibrometer such that one of the two diffraction beams represents the measurement beam and the other diffraction beam represents the reference beam.

8 Claims, 1 Drawing Sheet

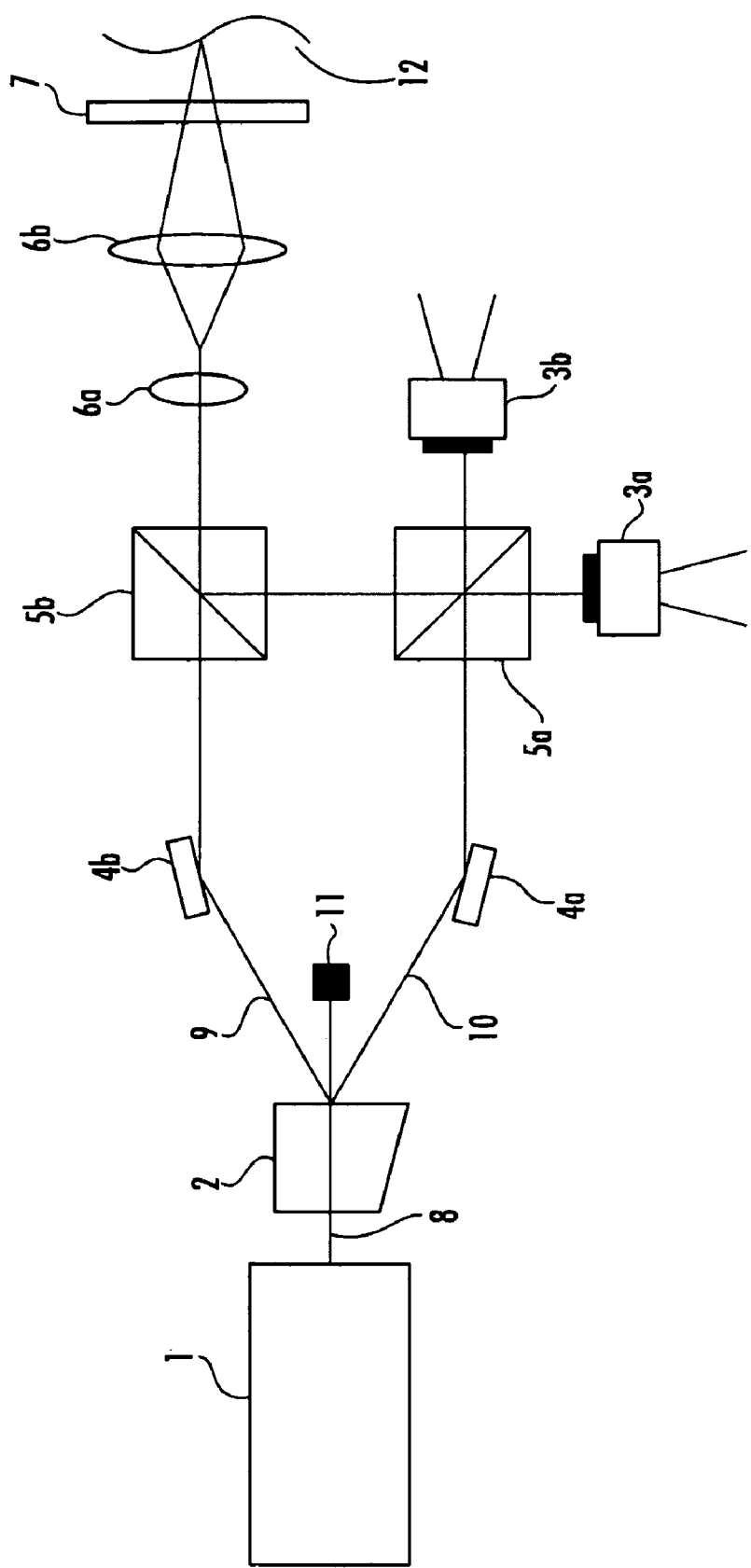

VIBROMETER AND METHOD FOR OPTICALLY MEASURING AN OBJECT

CROSS-REFERENCE TO RELATED APPLICATIONS

This application claims the benefit of German Patent Application DE 10 2008 017 119.0, filed Apr. 2, 2008, which is incorporated herein by reference as if fully set forth.

BACKGROUND

The invention relates to a vibrometer and a method for optically measuring an object.

It is known to measure oscillations at an object in a touchless fashion using a laser-Doppler vibrometer. A typical vibrometer of this type comprises a radiation source, a beam splitter, an optic interference device, and a detector.

A source beam created by a radiation source is split via the beam splitter into a measuring and a reference beam. Using the optic interference device, which may comprise several optic components, the measuring beam is guided to the object and the measuring beam, at least partially reflected by the object to be measured is once more interfered via the interference device, together with the reference beam, to the detector, so that via the detector an interference signal can be measured between the measuring and the reference beam.

The frequency of the measuring beam is influenced by the movement or oscillation of the surface of the object such that conclusions can be drawn from the interference signal of the measuring beam and the reference beam to the movement of the object, particularly the speed of motion or the oscillation frequency of the surface of the object.

Here, the radiation source must create monochromatic radiation or at least radiation with a sufficiently large coherence length. Typically, lasers are used as the radiation source.

Furthermore, it is known to embody a vibrometer as a heterodyne vibrometer. Here, using a frequency shift unit, a frequency difference is created between the measuring beam and the reference beam. Thus, in the measuring signal of the detector a measuring signal results from the interference of the measuring beam and the reference beam with a carrier frequency, which is equivalent to the frequency difference between the measuring beam and the reference beam.

Using the heterodyne vibrometer, not only the speed of motion can be determined but also the direction of motion of the object to be measured. Furthermore, by the use of the heterodyne vibrometer, advantages can be isolated during the processing of the measuring signal, particularly technical noise in the low-frequency range.

Based on the present technical developments, particularly in micro-system technology, the measuring of increasingly smaller objects with increasing oscillation frequencies and/or speeds of motions is desirable.

SUMMARY

The invention is therefore based on the object to create a laser-Doppler vibrometer for optically measuring oscillations at an object and a method for optically measuring an object, which increases the maximally measurable oscillation frequency and/or speed of motion in reference to conventional vibrometers and/or methods. Furthermore, the vibrometers and/or the method allow a cost-effective implementation and reduced possibility of errors. Additionally, the loss of intensity from the source beam to the measuring beam and/or reference beam shall be low.

An essential foundation of the invention lies in the fact that the maximally measurable oscillation frequency in heterodyne vibrometers depends on the carrier frequency, i.e. the difference in frequency between the measuring beam and the reference beam: the higher the carrier frequency, the higher the maximally measurable oscillation frequency.

The vibrometer according to the invention comprises a radiation source, a beam splitter, an optic interference device, and a detector.

The source beam, created by the radiation source, reaches the beam splitter and is split thereby into a measuring beam and a reference beam. The interference device is provided cooperating with the detector such that the measuring beam, at least partially reflected by the object to be measured, and the reference beam interfere at the detector, so that via the detector an interference signal of the measuring beam and the reference beam can be measured.

Furthermore, the vibrometer according to the invention is embodied as a heterodyne vibrometer, which comprises an optic frequency shift device. This device is arranged in the optical path of the vibrometer such that a frequency difference between the measuring beam and the reference beam is created, and that accordingly a carrier frequency develops according to the frequency difference in the interference signal of the interfered measuring beam and reference beam.

It is essential that the beam splitter and the frequency shift device are embodied as an acousto-optic modulator in an optic element. Using the acousto-optic modulator the source beam is deflected such that at least two diffraction beams are emitted from the acousto-optic modulator. A first deflected beam of the diffraction order of 1 and a second diffraction beam of the diffraction order of −1.

The acousto-optic modulator is arranged inside the optical path of the vibrometer such that one of these diffraction beams represents the measuring beam and the other diffraction beam the reference beam. Thus, either the measuring beam represents the diffraction beam of the diffraction order of 1 and the reference beam the diffraction order of −1 or vice versa.

The invention is based on the realization of the applicant that by using the diffraction beams of the diffraction orders of 1 and −1, a frequency difference between the measuring beam and the reference beam can be created which is twice as high in reference to the conventional use of acousto-optic modulators, arranged in the optical path of one beam only, for example the reference beam, in order to shift its frequency.

The vibrometer according to the invention allows therefore a higher carrier frequency and a higher maximally measurable oscillation frequency. Simultaneously the vibrometer according to the invention can be produced in a cost-effective and fail-safe manner by using only one acoustiooptic modulator as the beam splitter and the frequency shift unit.

In general, the use of higher diffraction orders are also possible, however the diffraction beams of the order of 2 and −2 already show a considerably higher loss in intensity in reference to the intensity of the source beam compared to the use of the diffraction beams of the orders of 1 and −1.

Advantageously, the acousto-optic modulator is embodied as a Bragg cell, i.e. by coupling acoustic waves in the Bragg cell a desired diffraction grid is created, which leads to the desired emission of the diffraction beams of the diffraction orders of 1 and −1 with the predetermined frequency difference.

The use of an acousto-optic modulator to create diffraction beams of the diffraction orders of 1 and −1 is known per se and has been described, for example, in "Acousto-optic $TeO_2$ Tunable Filter Using Far-off-axis Anisotropic Bragg Diffraction" T. Yano and A. Watanabe, Applied Optics, vol. 15, no. 9, September 1976" and "AOTF-bases Systems For Image Cytometry", Bartec Rajwa et al., Proc. SPIE volume 5694-spectral imaging: instrumentation, applications, and analysis III (2005)". Particularly advantageous is the use of $TeO_2$ as the material for the acousto-optic modulator.

Furthermore, it is advantageous to embody the acousto-optic modulator such that it operates in the "slow shear mode". This application of an acousto-optic modulator, known per se, provides for the coupling of acoustic waves into the acousto-optic modulator, not leading to a periodic compression of the crystalline structure of the acousto-optic modulator but to shearing. This way, the creation of a desired diffraction grid in the acousto-optic modulator is possible by coupling lower-powered acoustic waves so that a more cost-effective and more robust design can be achieved.

Advantageously, the radiation source is embodied such that it creates a monochromatic beam of a predetermined source wavelength or at least a beam with a predetermined minimally coherence length.

Preferably the radiation source is embodied as a laser, particularly a DPSS—laser (diode pumped solid state laser), advantageously showing a wavelength of 532 nm. Particularly the use of a DPSS-Nd: Yag-laser is advantageous, in which the standard wavelength of the light beam with 1064 nm created is reduced via a doubling crystal to 532 nm.

In order to achieve optimal intensity for the measuring beam and reference beam the acousto-optic modulator is advantageously embodied such that the optimal wave angle of the source beam for maximum intensity of the diffraction beam of the order of 1 is identical to the optimal wave angle of the source beam for a maximum intensity of the diffraction beam of the order of −1, with this optimization being imperative at least for the wavelength of the incident source beam. This way an optimized intensity of the measuring beam and the reference beam is ensured.

Advantageously, the vibrometer comprises a processing unit to evaluate the measuring signals of the detector.

By using the vibrometer according to the invention, high oscillation frequencies can be measured, however this requires a correspondingly high scanning rate for a digital processing of the measurement signals of the detector.

Therefore it is particularly advantageous for the processing of the measurement signals of the detector not to occur simultaneously, but for the measurement signals of the detector to be digitized and saved in a storage medium. This way it is no longer necessary that, together with the predetermined scanning rate an appropriate processing speed must be set as well.

Only the digitizing unit must be embodied such that scanning the measurement signal of the detector and an appropriate digitization and storage of digital data is ensured at the predetermined scanning rate. In particular, it is advantageous for the measurement data of the detector to be digitized and/or saved via a storage oscilloscope.

The actual processing of the digitized measurement signals occurs "off-line", i.e. independent from the scanning rate with regard to time.

Advantageously, the vibrometer according to the invention therefore comprises a processing unit, a storage unit, and a digitizing unit, embodied cooperating with the detector such that the measurement data of the detector can be digitized at a predetermined scanning rate by the digitizing unit and can be saved in a digital form in the storage unit.

Examinations of the applicant have shown that here a scanning rate is advantageous amounting to at least twice the carrier frequency, particularly at least fourfold, preferably sixfold the carrier frequency. Typical carrier frequencies of the device according to the invention and the method according to the invention amount to approx. 600 MHz, so that an advantageous scanning rate higher than 1.2 GHz result, particularly higher than 2.4 GHz, preferably higher than 3.6 GHz.

The vibrometer according to the invention advantageously comprises a processing unit for the demodulation of the measurement data of the detector, with the storage unit comprising a data output for displaying the saved digital data and the processing unit a data inlet for entering this digital data. The processing unit is embodied cooperating with the storage unit such that an off-line demodulation of the saved digital measurement data is executed similar to the above-described manner.

When using an acoustoopic modulator, in addition to the desired diffraction beams of the order of 1 and −1, usually other diffraction beams are also emitted from the acoustoopic modulator, particularly a beam of the order of 0. Advantageously, the vibrometer according to the invention therefore comprises at least one optic radiation trap, which is arranged in the optical path of the acousto-optic modulator such that one or more diffraction beams are absorbed by the radiation trap, except for the one of the order of 1 and −1, particularly the diffraction beam of the order of 0.

The present invention is therefore based on the knowledge that an increase of the maximally measurable oscillation frequency is achieved by the use of diffraction beams of the order of 1 and −1 of the source beam.

A method according to the invention for optically measuring an object comprises the following processing steps:

In a processing step A a source beam is created and in a processing step B said source beam is split into a reference beam and a measuring beam and a frequency difference between the reference beam and the measuring beam is created.

In a processing step C the reference beam and the measuring beam, at least partially reflected by the object, is interfered on a detector.

Finally, in a processing step D, an evaluation of the measurement data of the detector is performed.

It is essential that in the processing step B the splitting of the source beam and the creation of the frequency difference is performed by an acousto-optic modulator, with the source beam being split into at least two diffraction beams using the acousto-optic modulator, namely a diffraction beam of the order of 1 and a diffraction beam of the order of −1. Here, one of the two diffraction beams represents the reference beam and the other diffraction beam the measuring beam.

Furthermore, in step B the frequency difference between the reference beam and the measuring beam is created by the acousto-optic modulator.

In an advantageous embodiment of the method according to the invention the measurement data of the detector is digitized in step D and saved in a storage medium in a digital form. It is particularly advantageous when in step D the measurement data is processed such that measurement data saved in a digital form is read and processed by a processing unit.

An additional increase of the maximally measurable oscillation frequency is possible by the method according to the invention, described in the following, for optically measuring an object. This method according to the invention leads to an increase of the maximally measurable oscillation frequency and can be used individually or in combination with the previously described method, with a further increase of the maximally measurable oscillation frequency results from the combination of both methods.

The method according to the invention is based on the knowledge that a modification of the process leads to an increased maximally measurable oscillation frequency when processing the measurement signals of the detector.

The process according to the invention comprises the above-described processing steps A through D.

It is essential for step D to comprise the following steps:

In a step D1 the measurement signal of the detector is scanned with a predetermined scanning frequency $f_S$ for a predetermined scanning term $T_S$. This way, a predetermined number $n=rd[f_S*T_S]+1$ of scanning processes, with $rd[x]$ being the whole number closest to x, determined by rounding, so that the predetermined number n is a natural number.

Thus, in step D1 a temporal discreditization of the measurement signal of the detector is performed.

In a step D2, the measurements yielded in the scanning process are saved in a digital form as measurements $A[i]$ for each scanning process. This storage can occur simultaneously or via a buffer storage temporarily off-set in reference to the scanning process described in step B1.

Therefore a total of n-measurements are saved in a digital form.

In a step D3 a complex spectrum $F[i]$ is determined from the saved measurements by way of frequency transformation, e.g., using a frequency transformation known per se: Discrete Fourier-transformation (DFT), Fast-Fourier-Transformation (FFT) or Discrete Hartley Transformation (DHT.) The complex spectrum comprises n values $F[i]$ ($i=1, 2 \ldots n$). This determination of a complex spectrum from the discrete measurements is known per se, particularly the use of the Discrete Fourier-Transformation. In a total number of discrete measurements equivalent to a power of two, advantageously the Fast-Fourier Transformation is used. The execution of the Discrete Fourier-Transformation has been described, for example, in the book E. Oran Brigham, "FFT Schnell Fourier-Transformation", 4$^{th}$ Edition, R. Oldenbourg Verlag 1989, ISBN 3-486-21332-6 on pages 113 through 135 and the Fast Fourier-Transformation on pages 181 through 207 of the same publication.

Now, it is essential that in a step D4 an expanded complex spectrum is determined. The determination of the expanded spectrum is based on the following realization. In the following formulas, as common in mathematics, the multiplication operators are not listed explicitly.

Generally, the discrete DFT or FFT-spectrum always has only one entry for the signal offset, namely the first entry in the list for the frequency zero. For real time signals the spectrum is reflected via the indices $F[i_H]=F[i_{L,max}-i_L+1]$ for even n and $F[i_H]=F[i_{L\ max}-i_L+2]$ for odd n, with $i_L$ representing all indices 2 ... (n+1)/2 for odd n and 2 ... n/2+1 for even n. The greatest index allocated to $i_L$ is called $i_{L\ max}$. $i_H$ represents all indices greater than 1 of i, not included in $i_L$. Among even n the highest frequency value $F[i_{L\ max}]$ only appears once in the list. The off-set entry appears in both cases only once at $i=i_0=1$. The individual discrete frequency lines are separated by $\Delta F=F[I+1]-F[i]=1/T_S$, with $T_S$ representing the overall scanning period of the scanning process in step D1.

Now, it is essential that in a step D4 an expanded complex spectrum $F_{exp}$ is determined, with entries multiplied by 2m, $m\epsilon N$.

First, the index $i_C$ of the carrier frequency $f_C$ is determined in the complex spectrum, i.e. for the index for which it is imperative that: $f_C=F[i_C]$. The index $i_C$ therefore shows which discrete variable $F[i_C]$ in the complex spectrum is equivalent to the carrier frequency $f_C$ (except for potential rounding errors at the determination of $i_C$).

The underlying idea when preparing the expanded spectrum is to shift the carrier frequency in the area of $i_L$ by m points towards higher indices, $f_C=F[i_C]\rightarrow f_{Cexp}=f_C+m\Delta F=F[i_{Cexp}=i_C+m]$ and that this way the frequency entries with an index greater than the shifted carrier frequency ($i>i_C$) remain at the same distance from the carrier frequency ($F_{exp}[i+m]=F[i]$) by an equivalent shift of the entries. This way a new discrete spectrum $F_{exp}$ results, which requires a total of entries $i_L$ times m, thus number $(i_{Lers})=m+$number $(i_L)$, with number $(i_X)$ representing the number of indices $i_X$. The entries with an index lower than $i_{C\ exp}$ are constructed from the entries of $F[i]$ with an index greater than $i_C$ (these entries now are equivalent to the entries $F_{exp}[i]$ with an index greater than $i_{C\ exp}$.) The negatively conjugated complex values are taken from these entries, i.e. the entries of $F_{exp}$ with an index lower than $i_{C\ exp}$ are calculated according to $F_{exp}[i_{C\ exp}-j]=-CC(F_{exp}[i_{C\ exp}+j])=-CC(F[i_C+j])$, with $j=1, 2, \ldots i_{C\ exp}-2$. This means, the originally frequency entries with the index $i<i_C$ are not used and are thus deleted. This way, a spectrum is constructed with a carrier frequency shifted by $m\Delta F$, at which the interference effects for frequencies lower than the original carrier frequency are suppressed. In order to allow the application of standard algorithms for the Inverse Discrete or Inverse Rapid Fourier Transformation for the retransformation in the temporal range, the entries for $i_{H\ exp}$ must be determined.

They can be calculated analog to the entries $i_{L\ exp}$ or can be determined via the formula $F[i_H]=F[i_{L,max}-i_L+1]$ for even n and $F[i_H]=F[i_{L,max}-i_L+2]$ for odd n from the entries of each point of time with the index $i_{L,exp}$. Similarly, an equivalent evaluation is possible using the Hartley transformation.

In order for sufficient information in the measurements to be provided for processing with an expanded band width, as described above, the scanning rate by which the measurements are processed, must be selected sufficiently high: generally it applies that $i_{L,max}$ must amount to at least $2\ i_C+m-1$ prior to the construction of the expanded spectrum. Furthermore, the connection applies that $i_{L,max}$ also rises with an increasing scanning rate. The scanning rate must therefore be selected sufficiently high so that $i_{L\ max}$ is greater or equal $2\ i_C+m-1$, if n+2m represents an odd number and $i_{L\ max}$ is greater or equal $2\ i_C+m-2$, if n+2m is an even number. When for example at a carrier frequency of 600 MHz, during processing the band width is increased to double the value (1.2 GHz) ($m=i_C$), the scanning rate must amount to at least six-fold the carrier frequency, i.e. at least 3.6 GHz.

It is a general feature that minor oscillations create a phase-modulated carrier at a heterodyne interferometer, with its side bands right and left from the carrier being at a defined phase relationship in reference to each other, i.e. $-J_1 \sin(2\pi(f_C-f_{mod})t)$ is imperative for a Bessel line left of the carrier if the Bessel line right of the carrier amounts to $J_1 \sin(2\pi(F_C-f_{mod})t)$. The goal of the signal processing is to use particularly this behavior and thus is equivalent to any alternative solution of the construction of an expanded spectrum of the frequency components f with $f>f_C$.

Alternatively the scanning term of the method according to the invention is selected such that it amounts to a whole number multiple at a period $T_C$ of the carrier frequency, i.e. $T_S=N\ T_C=N/f_C$, with N being a natural number. This way errors are avoided when calculating the expanded spectrum, because the carrier frequency is precisely in line with the discrete spectrum.

In an advantageous embodiment the method according to the invention comprises in step D4 the following steps:

In step D4 an expanded complex spectrum $F_{exp}[j]$ is determined, which is provided for a predetermined number m>0 with a total of values n+2 m, i.e. values for the indices j=

(1, 2 . . . , n+2 m) for $F_{exp}[j]$ are determined, with this determination comprising the following processing steps:

In a step i, the distance $\Delta F$ is determined between the frequency lines of the discrete spectrum. $\Delta F$ is also known as the frequency resolution. This preferably occurs by forming the difference $\Delta F=F[i_L+1]-F[i_L]$, with $i_L$ being defined as follows: $i_L$ defines all indices 2 . . . (n+1)/2 for odd n and 2 . . . n/2+1 for even n. The greatest index allocated to $i_L$ is called $i_{L\ max}$.

In a step ii the index $i_C$ of the carrier frequency $f_C$ is determined in the complex spectrum, i.e. it is imperative for the index that: $f_C=F[i_C]$.

The determination preferably occurs via $i_C=rd[(f_C/\Delta F)+1]$, with rd[x] being the number closest to x, determined by way of rounding. The index $i_C$ therefore shows which discrete variable $F[i_C]$ in the complex spectrum is equivalent to the carrier frequency $f_C$ (except for potential deviations due to rounding).

Similarly, the scope of the invention also includes to determine the frequency resolution over the entire scanning period, i.e. $\Delta F=1/T_S$.

In a step iii the carrier frequency in the expanded spectrum is determined at the index $i_{C,exp}=i_C+m$ via $F_{exp}[i_{C,exp}]=F[i_C]$.

In a step iv the values $F_{exp}$ are defined as follows: $F_{exp}[i_L+m]=F[i_L]$.

In a step v the values $F_{exp}[i_{C,exp}-i]$ for the indices I=(1, 2 . . . $i_{C,exp}=2$) are determined via $F_{exp}[i_{C,exp}-i]=-CC(F_{exp}[i_{C,exp}+i])$, with -CC(x) representing the negatively complex conjugate of a complex number x.

In a step vi the values $F[i_{H,exp}]$ are determined via the calculation rule $F_{exp}[i_{H,exp}]=F_{exp}[i_{L,max}+m-i_{L,exp}+1]$ for even n+2m and via $F_{exp}[i_{H,exp}]=F_{exp}[i_{L,\ max}+m-i_{L,exp}+2]$ for odd n+2m, with for the index $i_{L,exp}=2, 3 . . . i_{L,max}+m$ applies and for $i_{H,exp}=i_{L,max}+m+1, . . . , n+2m$.

In a step vii the expected complex spectrum $F_{exp}[j]$ (j=1, 2 . . . n+m) is retransformed into the period. This transformation preferably occurs via the Inverse Discrete Fourier Transformation or the Inverse Rapid Fourier Transformation.

In a step viii the demodulation of the retransformed expanded complex spectrum $F_{exp}$ occurs with the use of an expanded carrier frequency $f_{C,exp}=f_C+m\Delta F$.

It is particularly advantageous to use double the carrier frequency in the expanded spectrum, i.e. to select m as follows: $m=rd[f_C/\Delta F]$, with rd[x] representing the whole number closest to x determined by way of rounding. This way it is ensured that $f_{C,exp}=f_C+m\Delta F$ is approximately equivalent (except for the deviations due to the rounding of m) to double the carrier frequency $f_C$.

In the above-described variables $f_S$, $f_C$, and $f_{C,exp}$ have the unit [1/s] and the variable $T_S$ the unit [s].

In an advantageous embodiment the resulting complex frequency path $G_{ch}(\omega)$ of the signal transmission chain from the detector to the digitization unit is compensated by a digital filter. Here, the signal transmission chain comprises all components of the device, which potentially influence the signal, particularly the optic components, the detector, as well as electric cables and connectors. The compensation can either occur at the discrete spectrum by a complex discrete frequency path $G_{comp}(\omega[i])=G_{comp}[i]$, which is selected such that the multiplication by components with a complex discrete spectrum $G_{ch}[i]$ result in a vector with ones as the entries $G_{ch}[i]G_{comp}[i]=1$. Alternatively, the retransformed (value) of the frequency path $G_{comp}[i]$, (e.g., via the Inverse Discrete Fourier Transformation, the Inverse Rapid Fourier Transformation, or the Inverse Direct Hartley Transformation) can be convolved via the stored time signal of the detector signal.

$G_{comp}[i]$ is the inverse discrete transmission function of $G_{ch}[i]$ ($G_{comp}[i]=G_{ch}^{-1}[i]$). The described filtering of the transmission chain via an inverse transmission function is known per se and described, for example, in Otto Foellinger, Regelungstechnik, 8th revised edition, Huettig Buch Verlag, Heidelberg, 1994, page 74.

BRIEF DESCRIPTION OF THE DRAWINGS

Additional advantageous embodiments are illustrated and described according to the exemplary embodiment of the vibrometer according to the invention shown in FIG. 1. Here it shows:

FIG. 1 is a schematic illustration of a vibrometer according to the invention.

DETAILED DESCRIPTION OF THE PREFERRED EMBODIMENTS

The vibrometer according to the invention, shown in FIG. 1, comprises a radiation source embodied as a laser 1, an acousto-optic modulator embodied as a Bragg cell 2, which combines the function of a beam splitter and a frequency shifting unit, and a detector comprising two photodiodes 3a and 3b. The scope of the invention also includes embodying the detector with one photodiode only.

The vibrometer further comprises an interference device, which comprises several optic components: diffraction mirror 4a, 4b; beam splitter 5a and 5b, optic lenses 6a and 6b, as well as a λ/4-plate 7.

The laser 1 creates a source beam 8, which is deflected by the bragg cell 2 such that a diffraction beam of the order of 1 and a diffraction beam of the order of -1 is emitted. The Bragg cell 2 is arranged in the optical path of the interference device such that the diffraction beam of the order of -1 is a measuring beam 9 and the diffraction beam of the order of 1 is a reference beam 10. Another beam of the order of 0, emitted from the Bragg cell, is absorbed by a radiation trap 11.

The measuring beam 9 is guided via the diffraction mirror 4b, the beam splitter 5b, the lenses 6a and 6b, as well as the λ/4-plate 7 to an oscillating object 12 to be measured.

The measurement beam 9, at least partially deflected by the object 12, reenters the optical path of the vibrometer and particularly the interference device and is guided via the λ/4-plate 7, the lenses 6b and 6a, the beam splitter 5b, and the beam splitter 5a to the photodiode 3a.

Through the use of the diffraction mirror 4a and the beam splitter 5a, the reference beam 10 is also guided to the photodiode 3a such that the deflector area of the photodiode 3a is interfered with the measuring beam and reference beam and thus an interference signal of the measuring beam and the reference beam can be measured via the photodiode 3a.

The Bragg cell 2 is further embodied as an acousto-optic modulator and is impinged by acoustic waves from an acoustic inciter device, not shown, such that a frequency difference is created between the measuring beam 9 and the reference beam 10.

The laser 1 is embodied as a frequency-doubled Nd:Yag laser and creates monochromatic light with a wavelength of 532 nm. The bragg cell is embodied such that the measuring bea, and the reference beam show a frequency difference of approx. 612 MHz.

The vibrometer shown in FIG. 1 therefore represents a heterodyne vibrometer with a carrier frequency of 612 MHz.

The Bragg cell 2 is here embodied such that for the light angle of the source beam 8 into the Bragg cell 2 simultaneously a maximum intensity of the diffraction beam of the order of 1 as well as a maximum intensity of the diffraction beam of the order of −1 is given such that an optimization of intensity is achieved with regard to the measuring beam and the reference beam.

The invention claimed is:

1. A vibrometer for optic oscillation measurements of an object (12), comprising a radiation source for creating a source beam, a beam splitter for splitting the source beam into a measuring beam and a reference beam (10), an optic interference device for interfering the reference beam with the measuring beam (9), at least partially reflected by the object (12), and a detector, with the interference device and the detector being embodied cooperating such that the measuring beam (9) and the reference beam (10), at least partially reflected by the object (12), interfere on the detector, the vibrometer comprises a heterodyne vibrometer, an optic frequency shift unit is arranged in an optical path of the vibrometer, to form a carrier frequency by creating a frequency difference between the measuring beam and the reference beam (10), the beam splitter and the frequency shift device are embodied as an acousto-optic modulator in an optic component to deflect the source beam, with the acousto-optic modulator being embodied such that the source beam (8) entering the acousto-optic modulator can be split into at least two diffraction beams:

a first diffraction beam of the order of 1, and a second diffraction beam of the order of −1, and the acousto-optic modulator is arranged in the optical path of the vibrometer such that one of the two diffraction beams is the measuring beam (9) and the other of the diffraction beams is the reference beam (10), the acousto-optic modulator comprises a slow shear mode Bragg cell (2), and the radiation source is embodied such that it creates a monochromatic beam of a predetermined wavelength and the acousto-optic modulator is embodied such that an optimal light angle for a maximum intensity of the diffraction beam of the order of 1 is identical to a light angle for a maximum intensity of the diffraction beam of the order of −1, at least for an incoming beam having the predetermined wavelength.

2. A vibrometer according to claim 1, wherein the vibrometer comprises a processing unit to evaluate the measuring signals of the detector, with the processing unit comprising a storage unit and a digitization unit, embodied cooperating with the detector such that the measurements of the detector can be digitized with a predetermined scanning rate by the digitization unit and can be saved in a digital form in the storage unit, and the scanning rate is at least double the carrier frequency.

3. A vibrometer according to claim 2, characterized in that the vibrometer comprises a processing unit for the demodulation of the measurements of the detector, with the storage unit comprising a data outlet to display the saved digital data and the processing unit having a data input for entering digital data and the processing unit being embodied cooperating with the storage unit for an off-line demodulation of saved digital measurements.

4. A vibrometer according to claim 1, wherein the vibrometer comprises at least one acousto-optic radiation trap (11), which is arranged in the optical path of the acousto-optic modulator such that a diffraction beam or several diffraction beams are absorbed by the radiation trap (11), except those of the order of 1 and −1.

5. A method for optically measuring an object, comprising the following processing steps:

A) creating a source beam,

B) splitting the source beam into a reference beam and a measuring beam (9) and creating a frequency difference between the reference beam and the measuring beam, C) interfering the reference beam and the measuring beam, at least partially reflected by the object (12), to a detector, and D) evaluating measurements of the detector, wherein in step B the splitting of the source beam and the creation of the frequency difference is performed via an acousto-optic modulator such that the source beam (8) is split into at least two diffraction beams, including a diffraction beam of the order of 1 and a diffraction beam of the order of −1, with one of the two diffraction beams being the reference beam (10) and the other diffraction of the two diffraction beams being the measuring beam (9), and in step B further the frequency difference between the reference beam and the measuring beam (9) is created via the acousto-optic modulator, wherein the acousto-optic modulator comprises a slow shear mode Bragg cell (2), and the radiation source is embodied such that it creates a monochromatic beam of a predetermined wavelength and the acousto-optic modulator is embodied such that an optimal light angle for a maximum intensity of the diffraction beam of the order of 1 is identical to a light angle for a maximum intensity of the diffraction beam of the order of −1, at least for an incoming beam having the predetermined wavelength.

6. A method according to claim 5, wherein in step D the measurements of the detector is digitized and stored in a storage medium in a digital form, and in step D the measurements are processed such that the measurements stored in a digital form are read and processed by a processing unit.

7. The vibrometer according to claim 2, wherein the scanning rate is at least fourfold the carrier frequency.

8. The vibrometer according to claim 2, wherein the scanning rate is at least sixfold the carrier frequency.

* * * * *